＊

US011801788B2

(12) United States Patent
Aten et al.

(10) Patent No.: US 11,801,788 B2
(45) Date of Patent: Oct. 31, 2023

(54) VEHICLE LAMP ASSEMBLY HAVING AN ON/OFF SWITCH OPERATING PORTION (71) Applicant: NISSAN NORTH AMERICA, INC., Franklin, TN (US)

(72) Inventors: Daniel Aten, Novi, MI (US); Michael McDuffie, West Bloomfield Township, MI (US); Hiromi Felkins, Milford, MI (US); Michael Eberlein, Novi, MI (US); Samantha Wheeler, Sterling Heights, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/461,884

(22) Filed: Aug. 30, 2021

(65) Prior Publication Data
US 2023/0066884 A1 Mar. 2, 2023

(51) Int. Cl.
*B60Q 3/82* (2017.01)
*F21V 23/04* (2006.01)
*G05G 1/02* (2006.01)

(52) U.S. Cl.
CPC ............... *B60Q 3/82* (2017.02); *F21V 23/04* (2013.01); *G05G 1/025* (2013.01)

(58) Field of Classification Search
CPC ........ B60Q 1/0076; B60Q 3/082; G05G 1/02; H01H 3/122; H01H 3/125; H01H 3/12; H01H 9/02; H01H 13/14
See application file for complete search history.

(56) References Cited

U.S. PATENT DOCUMENTS

| | | | | | |
|---|---|---|---|---|---|
| 2,128,730 | A | * | 8/1938 | Murphy | F16B 2/246 403/361 |
| 2,412,119 | A | * | 12/1946 | Bentley | H01H 13/36 200/16 A |
| 2,574,330 | A | * | 11/1951 | Judd | G05G 1/12 16/DIG. 30 |
| 3,696,408 | A | * | 10/1972 | Bouchard | H01H 13/785 400/477 |
| 3,916,150 | A | * | 10/1975 | Abernethy | B41J 5/12 200/344 |
| 3,952,173 | A | * | 4/1976 | Tsuji | H01H 1/029 200/511 |
| 4,019,221 | A | * | 4/1977 | Baumgarten | A47J 45/074 220/759 |
| 4,450,332 | A | * | 5/1984 | Stamm | H01H 13/14 200/345 |
| 4,712,092 | A | * | 12/1987 | Boldridge, Jr | H01H 13/70 341/34 |
| 4,872,099 | A | * | 10/1989 | Kelley | B60Q 3/82 362/394 |
| 4,906,808 | A | * | 3/1990 | Burgess | H01H 13/585 200/527 |

(Continued)

Primary Examiner — Ismael Negron
(74) Attorney, Agent, or Firm — Global IP Counselors, LLP (57) ABSTRACT A vehicle lamp assembly includes a lamp finisher, a knob and a retainer. The lamp finisher defines an exterior housing for a light source of the vehicle lamp assembly. The knob is movable with respect to the lamp finisher to operate the light source between an ON state and an OFF state. The retainer is sandwiched between a portion of the lamp finisher and a portion of the knob. The knob is retained to the lamp finisher by the retainer.

15 Claims, 11 Drawing Sheets (56) References Cited

U.S. PATENT DOCUMENTS

| | | | | |
|---|---|---|---|---|
| 5,555,971 | A * | 9/1996 | Takada | H01H 3/125 |
| | | | | 200/344 |
| 5,743,383 | A * | 4/1998 | Yano | H01H 3/125 |
| | | | | 200/344 |
| 6,595,668 | B2 * | 7/2003 | Hatagishi | B60Q 3/51 |
| | | | | 362/490 |
| 6,616,311 | B2 * | 9/2003 | Soga | B60Q 3/82 |
| | | | | 362/490 |
| 7,073,930 | B2 * | 7/2006 | Tiesler | B60Q 3/76 |
| | | | | 362/528 |
| 7,547,119 | B2 * | 6/2009 | Kuwana | B60Q 3/80 |
| | | | | 362/147 |
| 9,115,860 | B2 * | 8/2015 | Suzuki | B60Q 3/82 |
| 9,180,811 | B2 * | 11/2015 | Maruyama | B60Q 3/82 |
| 9,384,921 | B2 * | 7/2016 | Bekaert | G05G 1/12 |
| 9,409,514 | B2 * | 8/2016 | Shiraishi | B60Q 3/64 |
| 9,704,666 | B2 * | 7/2017 | Kuo | H01H 3/122 |
| 9,941,069 | B2 * | 4/2018 | Chen | H01H 13/14 |
| 10,824,183 | B1 * | 11/2020 | Cruz-PÉRez | G05G 1/12 |

* cited by examiner

VEHICLE LAMP ASSEMBLY HAVING AN ON/OFF SWITCH OPERATING PORTION

BACKGROUND

Field of the Invention

The present invention generally relates to a vehicle lamp assembly. More specifically, the present invention relates to a vehicle lamp assembly provided in an interior cabin of a vehicle.

Background Information

A vehicle room illumination lamp is a type of personal lamp including one or more illumination portions for illuminating a driver's seat or a passenger's seat of the vehicle. Vehicle room illumination lamps can serve as map lamps or interior room illumination lamps. A vehicle room illumination lamp can include one or more knobs or switches for operating the vehicle room illumination lamp between an ON (illumination) state and an OFF (non-illumination) state.

SUMMARY

In view of the state of the known technology, one aspect of the present disclosure is to provide a vehicle lamp assembly comprising a lamp finisher, a knob and a retainer. The lamp finisher defines an exterior housing for a light source of the vehicle lamp assembly. The knob is movable with respect to the lamp finisher to operate the light source between an ON state and an OFF state. The retainer is sandwiched between a portion of the lamp finisher and a portion of the knob. The knob is retained to the lamp finisher by the retainer.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
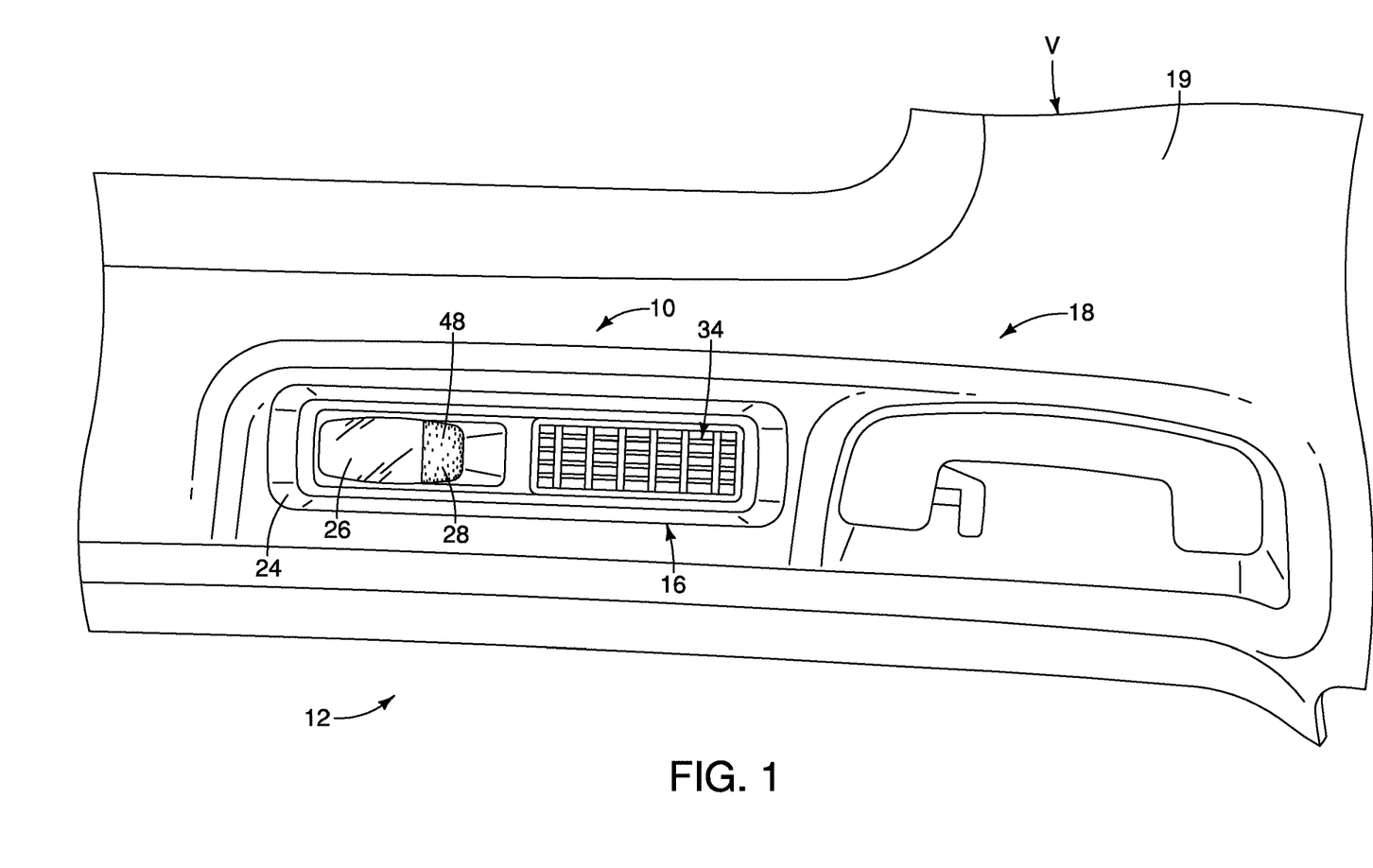
FIG. 1 is a plan view of a portion of a vehicle ceiling equipped with a vehicle lamp assembly in accordance with an illustrated embodiment.

Referring initially to FIG. 1, a vehicle lamp assembly 10 is illustrated in accordance with an illustrated embodiment. The vehicle lamp assembly 10 is an interior room illumination lamp provided within a passenger compartment of a vehicle V. The vehicle lamp assembly 10 functions as a personal lamp that illuminates as a dome light or a courtesy light for illuminating an area in the vicinity of a rear passenger seat. The vehicle lamp assembly 10 can alternatively also function as an interior map lamp.

Figure 2:
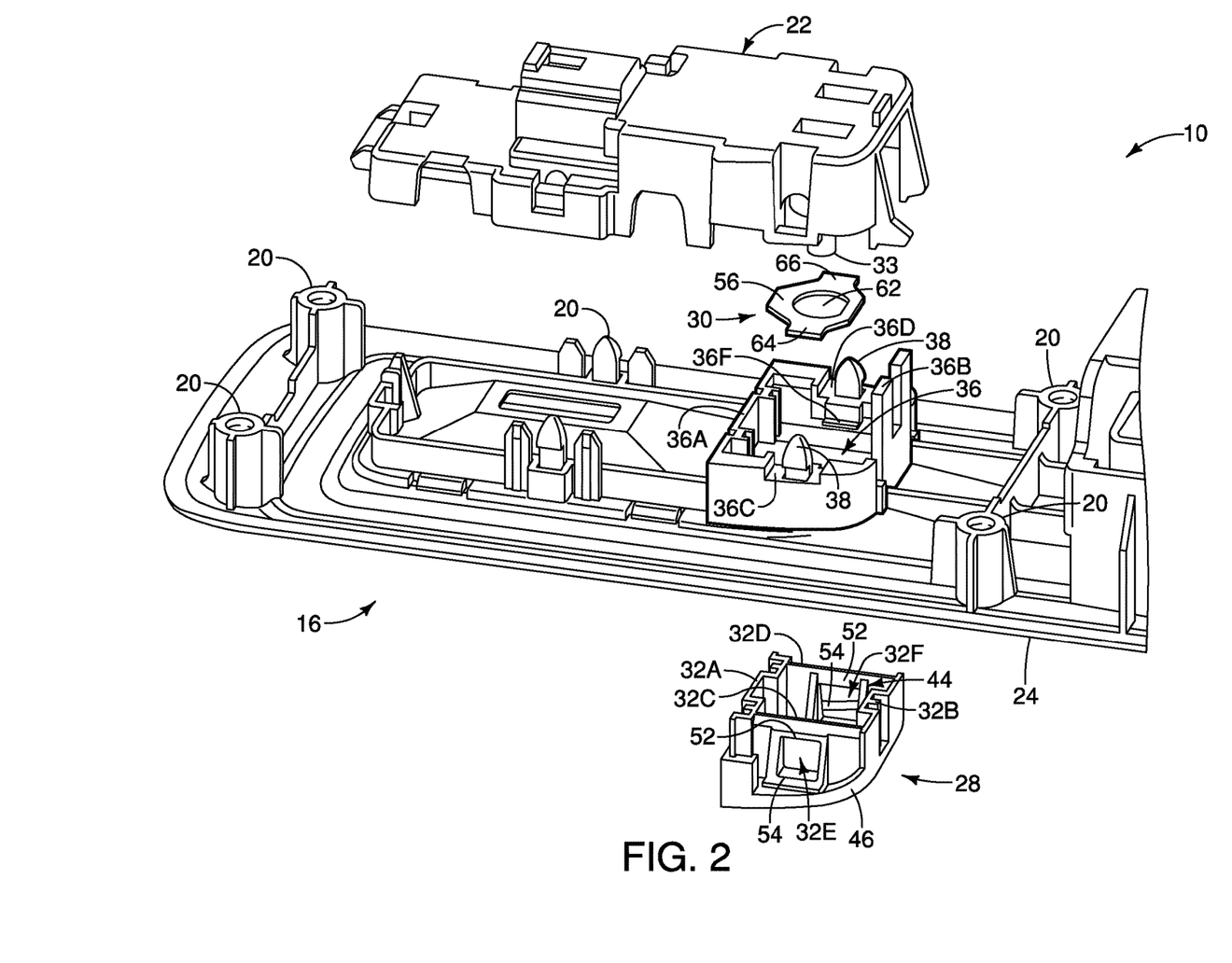
FIG. 2 is an interior exploded view of the vehicle lamp assembly.

As seen in FIG. 1, the vehicle lamp assembly 10 is provided in an opening (not shown) in the vehicle's V ceiling 14. In particular, the vehicle lamp assembly 10 comprises a lamp finisher 16 that defines an exterior housing for the vehicle lamp assembly 10 that is mounted to the opening. Preferably, the vehicle lamp assembly 10 is supported to a headliner 18 that is a layer of fabric and foam separating the interior of the vehicle V from a body panel of the vehicle V. As best seen in FIG. 2, the lamp finisher 16 includes a plurality of retentions/fasteners 20 on an interior side of the lamp finisher 16. The retentions/fasteners 20 are provided for securing the components of the vehicle lamp assembly 10 into the opening of the headliner 18.

Figure 3:
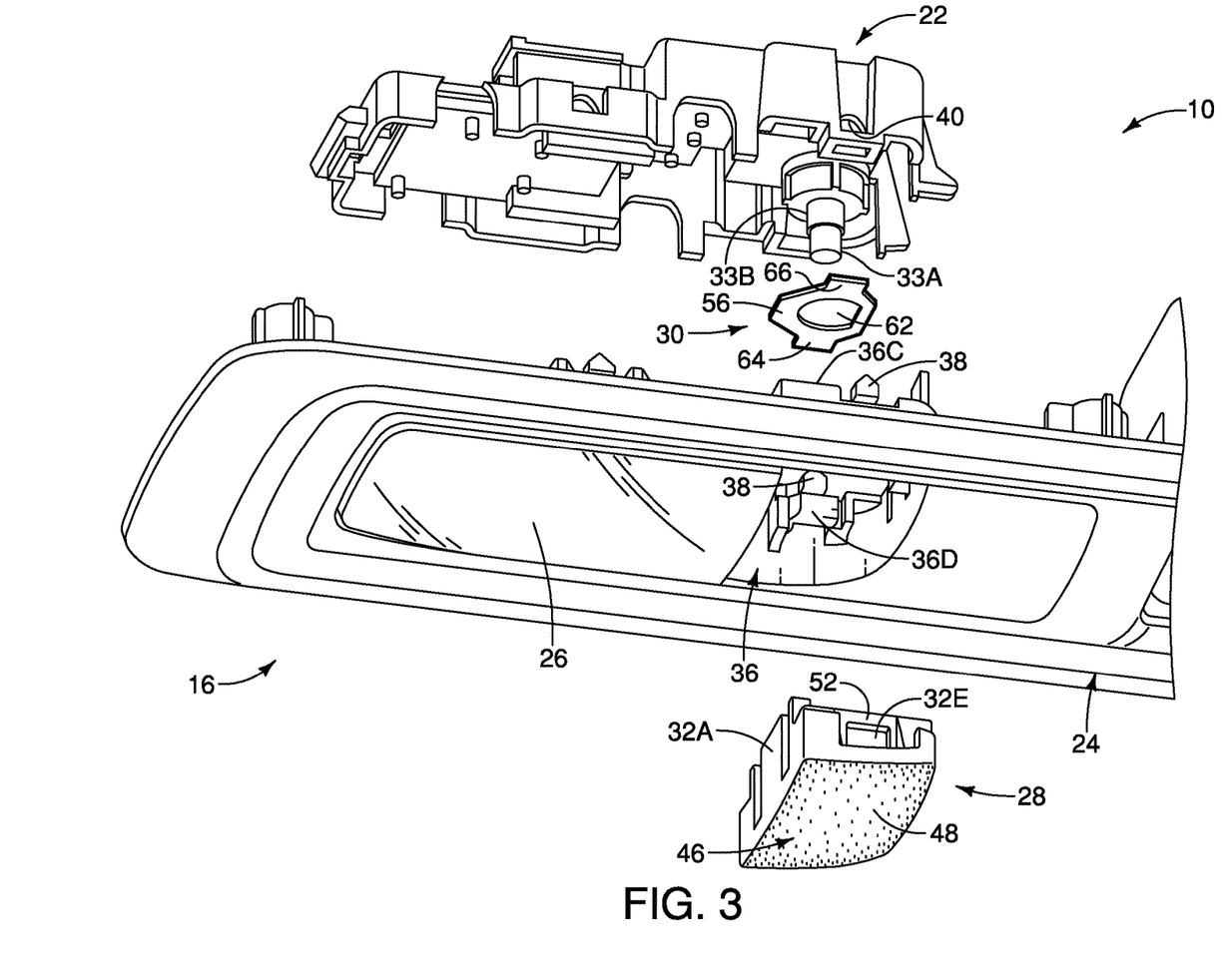
FIG. 3 is an exterior exploded view of the vehicle lamp assembly.

As best seen in FIGS. 2 and 3, the vehicle lamp assembly 10 further comprises an interior housing 22 that is coupled to the lamp finisher 16. Together, the lamp finisher 16 and the interior housing 22 define an overall housing that houses one or more light sources (not shown) of the vehicle lamp assembly 10. The light source(s) of the vehicle lamp assembly 10 can be electrically connected to a power supply wire harness W/H electrically connected to a battery (DC power source) (not shown) or a DC power unit (not shown) for transforming a voltage of the battery.

As best seen in FIGS. 2 and 3, the lamp finisher 16 includes a ceiling plate 24 that defines an outer perimeter of the lamp finisher 16. The ceiling plate 24 forms an exterior cover for the interior housing 22 and covers the opening in the headliner 18. The interior housing 22 is disposed on the interior side of the ceiling plate 24 and is covered by the ceiling plate 24. In the illustrated embodiment, "interior side" or "interiorly" will refer to a side or a direction towards or facing the inside of the opening in the ceiling 14. In the illustrated embodiment, "exterior side" or "exteriorly" will refer to a side or a direction towards or facing the passenger compartment of the vehicle V. As seen in FIG. 1, the lamp finisher 16 further includes a lens 26 that is supported to the ceiling plate 24. The lens 26 is a transparent or translucent synthetic resin for distributing light from the light source.

The vehicle lamp assembly 10 further comprises a knob 28 that is movable with respect to the lamp finisher 16 to operate the light source. In the illustrated embodiment, the knob 28 is fitted to the lamp finisher 16 at a location adjacent to the lens 26, as seen in FIGS. 1 to 3. The knob 28 is movable inward and outward with respect to the ceiling plate 24. The light source switches between an ON state and an OFF state when the occupant of the vehicle V presses the knob 28. In the illustrated embodiment, the knob 28 also forms a cover that covers the interior housing 22. The vehicle lamp assembly 10 of the illustrated embodiment further comprises a retainer 30. The knob 28 is retained to the lamp finisher 16 by the retainer 30, as will be further described below.

Figure 4:
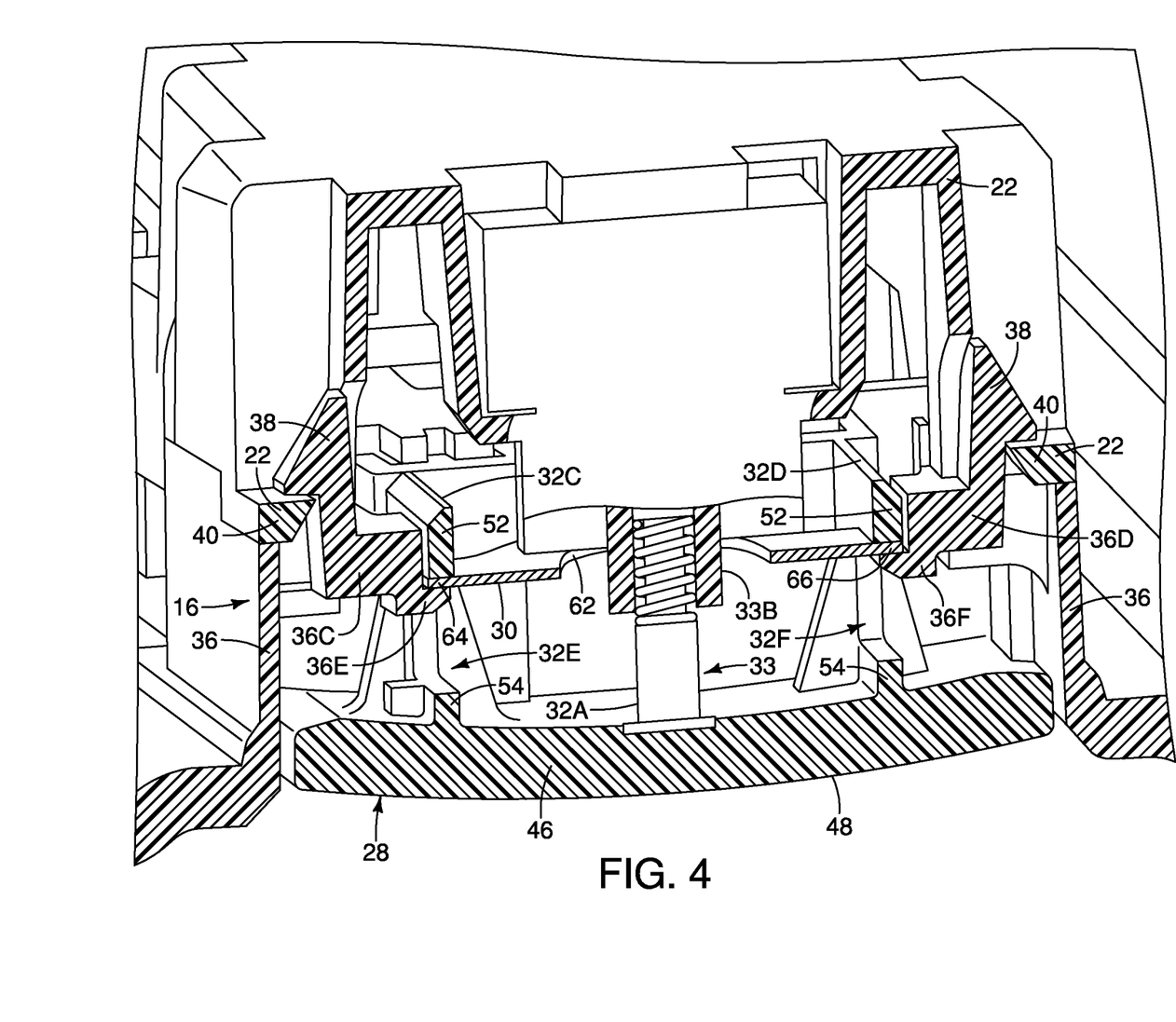
FIG. 4 is a cross-sectional view of a portion of the vehicle lamp assembly.

Referring to FIGS. 2 to 4, the interior housing 22 is assembled to the lamp finisher 16 from the interior side of the lamp finisher 16. The interior housing 22 can house a circuit board (not shown) that mechanically supports and electrically connects the light source to an electric control module (not shown) that can control the light source in accordance with the vehicle's interior lighting system. The interior housing 22 further houses a knob plunger 33 of the vehicle lamp assembly 10. Therefore, the vehicle lamp assembly 10 further includes the knob plunger 33. The knob plunger 33 is operatively connected to the knob 28 to operate the light source via user operation of the knob 28.

As best seen in FIGS. 3 and 4, the knob 28 contacts the knob plunger 33 to push the knob plunger 33 interiorly. As seen in FIG. 4, the knob plunger 33 preferably includes an adjustable spring cushioned tip 33A disposed inside a housing 33B of the knob plunger 33. The knob plunger 33 is operatively connected to the knob 28 to operate the light source. In this way, the knob 28 is movable with respect to the lamp finisher 16 to operate the light source between the ON and OFF states. As shown in FIG. 4, the knob plunger 33 extends through a portion of the retainer 30. The interior housing 22 is fitted to the lamp finisher 16 to secure the knob 28 within the lamp finisher 16. Preferably, the interior housing 22 is snap-fitted to the lamp finisher 16.

The lamp finisher 16 is a plastic molding that supports the lamp to the headliner 18. As shown in FIGS. 2 and 3, the knob 28 and the interior housing 22 are assembled to the lamp finisher 16. In the illustrated embodiment, the lamp finisher 16 also supports an air vent 34. However, it will be apparent to those skilled in the vehicle field that the vent 34 is not necessary and the lamp finisher 16 can support an illumination device only. The ceiling plate 24 of the lamp finisher 16 is preferably substantially flush with the headliner 18 when the lamp finisher 16 is installed to the ceiling 14.

Figure 5:
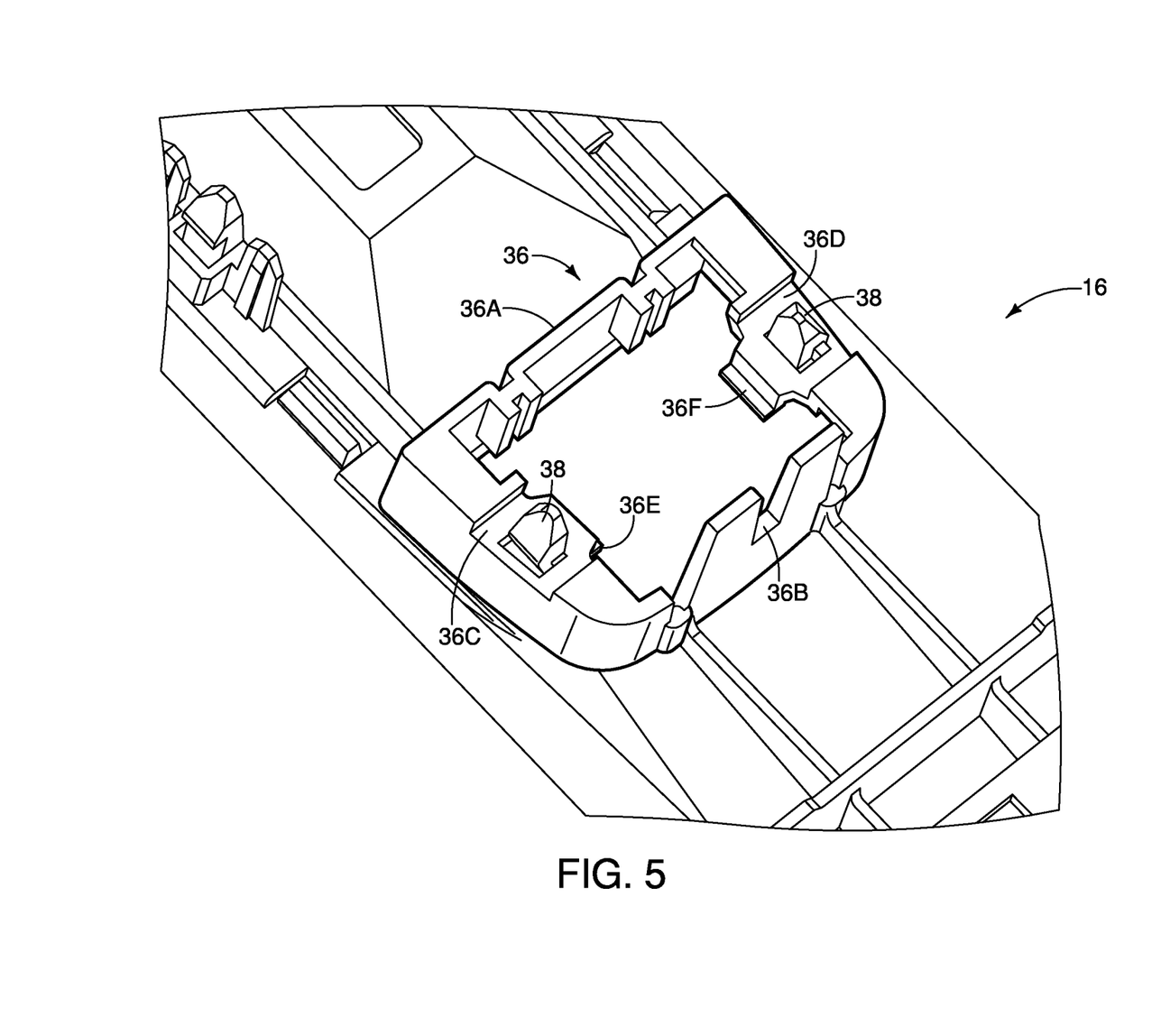
FIG. 5 is an enlarged perspective view of a portion of a lamp finisher of the vehicle lamp assembly.

As best seen in FIGS. 2, 3 and 5, the lamp finisher 16 includes a first receptacle 36 that is integrally formed with the ceiling plate 24. The first receptacle 36 receives the knob 28 and the knob 28 is movable within the first receptacle 36. As seen in FIGS. 2 and 3, the knob 28 is fitted to the first receptacle 36 of the lamp finisher 16 from the exterior side of the lamp finisher 16. The first receptacle 36 receives the knob plunger 33 therethrough from the interior side to contact the knob 28, as seen in FIG. 4.

As seen in FIGS. 4 and 5, the first receptacle 36 includes a pair of front and rear sidewalls 36A and 36B. The first receptacle 36 further includes a pair of lateral sidewalls 36C and 36D. The first receptacle 36 further includes a pair of fasteners 38 that extend towards the interior housing 22. The fasteners 38 extend from the lateral sidewalls 36C and 36D to engage with the interior housing 22, as shown in FIG. 4.

Preferably, the fasteners 38 engage with corresponding fasteners 40 of the interior housing 22 so that the lamp finisher 16 and the interior housing 22 are mated by snap-fit. In the illustrated embodiment, the fasteners 38 and the corresponding fasteners 40 form a cantilever snap-fit connection between the lamp finisher 16 and the interior housing 22. It will be apparent to those skilled in the vehicle field from this disclosure that the manner and type of fastening means between the lamp finisher 16 and the interior housing 22 can vary as needed and/or desired.

As best seen in FIGS. 4 to 7, the first receptacle 36 includes a pair of first and second side extensions 36E and 36F that operatively engage with the knob 28. The first and second side extensions 36E and 36F extend from the lateral sidewalls 36C and 36D of the first receptacle 36. As best seen in FIG. 4, the retainer 30 sits on the first and second side extensions 36E and 36F. In this way, the retainer 30 forms a bridge that connects the lateral sidewalls 36C and 36D of the first receptacle 36.

Therefore, the retainer 30 extends laterally across the first receptacle 36 to sit on the first and second side extensions 36E and 36F. It will be apparent to those skilled in the vehicle field from this disclosure that the first receptacle 36 and the retainer 30 can be reconfigured so that the retainer 30 sits on protrusions of the front and rear sidewalls 36A and 36B in order to retain the knob 30 to the lamp finisher 16.

As best seen in FIGS. 6 to 9, the knob 28 includes a pair of front and rear sidewalls 32A and 32B. The knob 28 includes a pair of lateral sidewalls 32C and 32D. The front and rear walls 32A and 32B and the lateral sidewalls 32C and 32D together define a second receptacle 44 of the vehicle lamp assembly 10. The second receptacle 44 of the knob 30 is received by the first receptacle 36 of the lamp finisher 16. As best seen in FIG. 4, the second receptacle 44 receives the knob plunger 33 therethrough from the interior side so that the knob plunger 33 contacts the knob 28.

Figure 6:
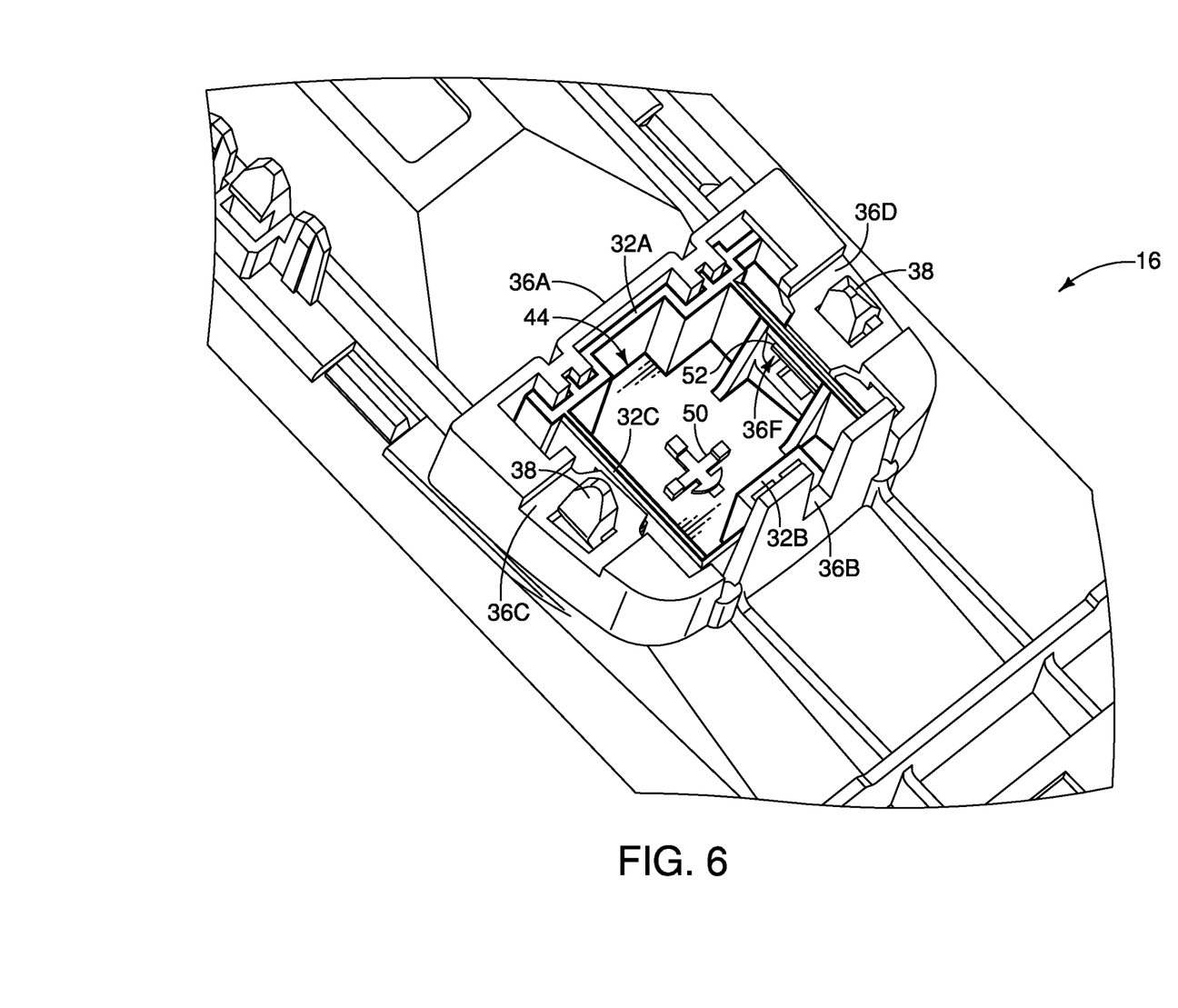
FIG. 6 is an enlarged perspective view of the lamp finisher having a knob of the vehicle lamp assembly received therein.

The knob 28 further includes a base 46 that connects the front and rear sidewalls 32A and 32B and the lateral sidewalls 32C and 32D. The exterior side of the base 46 defines a user contact surface 48 to operate the knob 28, as seen in FIG. 1. The interior side of the base 46 includes a plunger attachment 50 that is fitted to the knob plunger 33 to engage with the knob plunger 33, as seen in FIG. 6. That is, the tip 32A of the knob plunger 33 can be received by the plunger attachment 50, preferably by press-fit or by interference fit.

As best seen in FIGS. 2 to 4 and 7, the lateral sidewalls of the knob 28 includes a pair of first and second side openings 32E and 32F, respectively. Each of the side openings 32E and 32F is defined by an upper bridge 52 and a bottom bridge 54. The first and second side extensions 36E and 36F of the lamp finisher 16 extend at least partially into the first and second side openings 32E and 32F of the knob 28. As best seen in FIG. 4, the retainer 30 extends partially through the first and second side openings 32E and 32F of the second receptacle 44. In this way, the retainer 30 is sandwiched between the first and second side extensions 36E and 36F of the lamp finisher 16 and the lateral sidewalls of the knob 28. Thus, the retainer 30 extends laterally across the second receptacle 44 of the knob 28.

Figure 7:
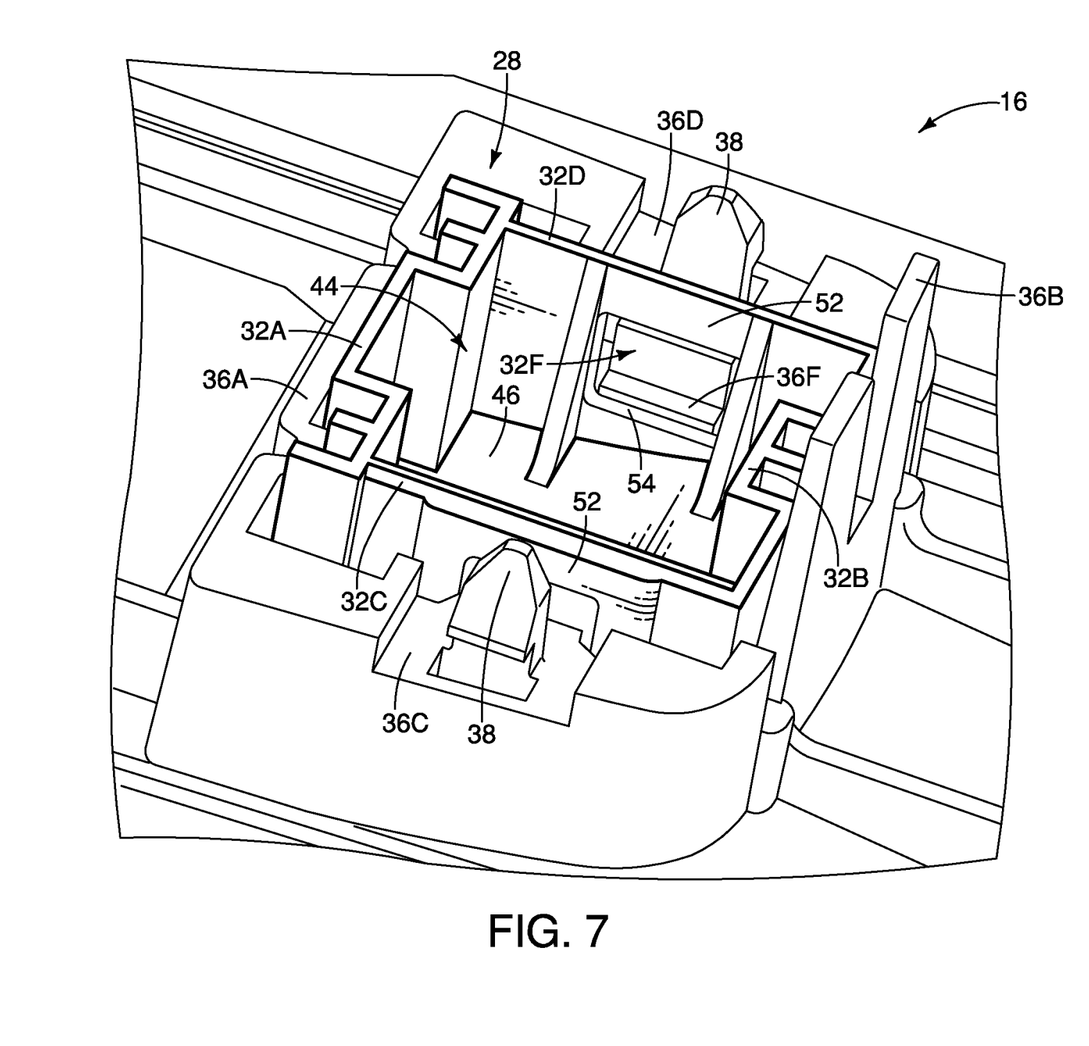
FIG. 7 is a perspective view of the lamp finisher having the knob of the vehicle lamp assembly received therein.
Figure 8:
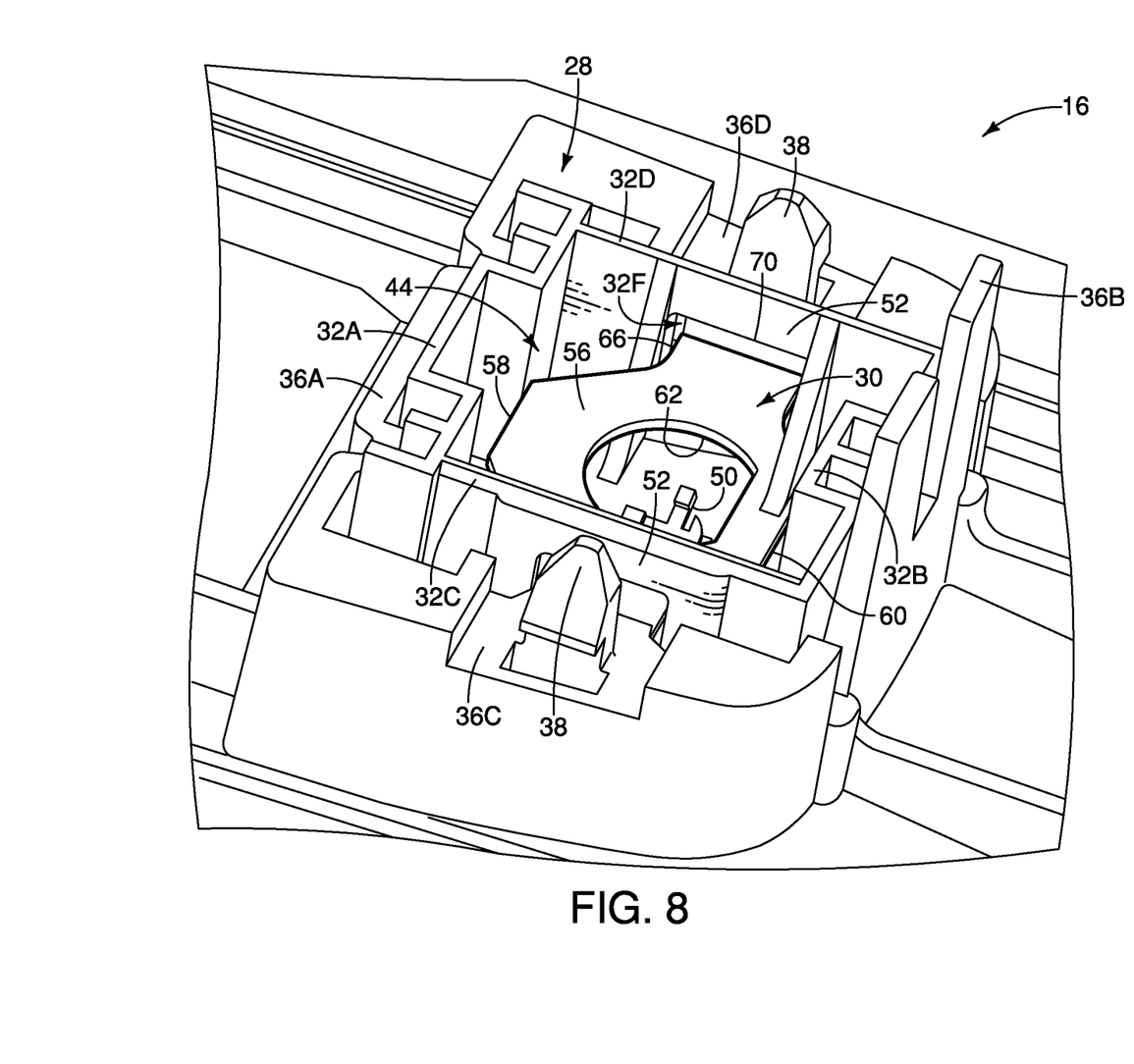
FIG. 8 is a perspective view of the lamp finisher similar to FIG. 7 and further having a retainer disposed in the lamp finisher.
Figure 9:
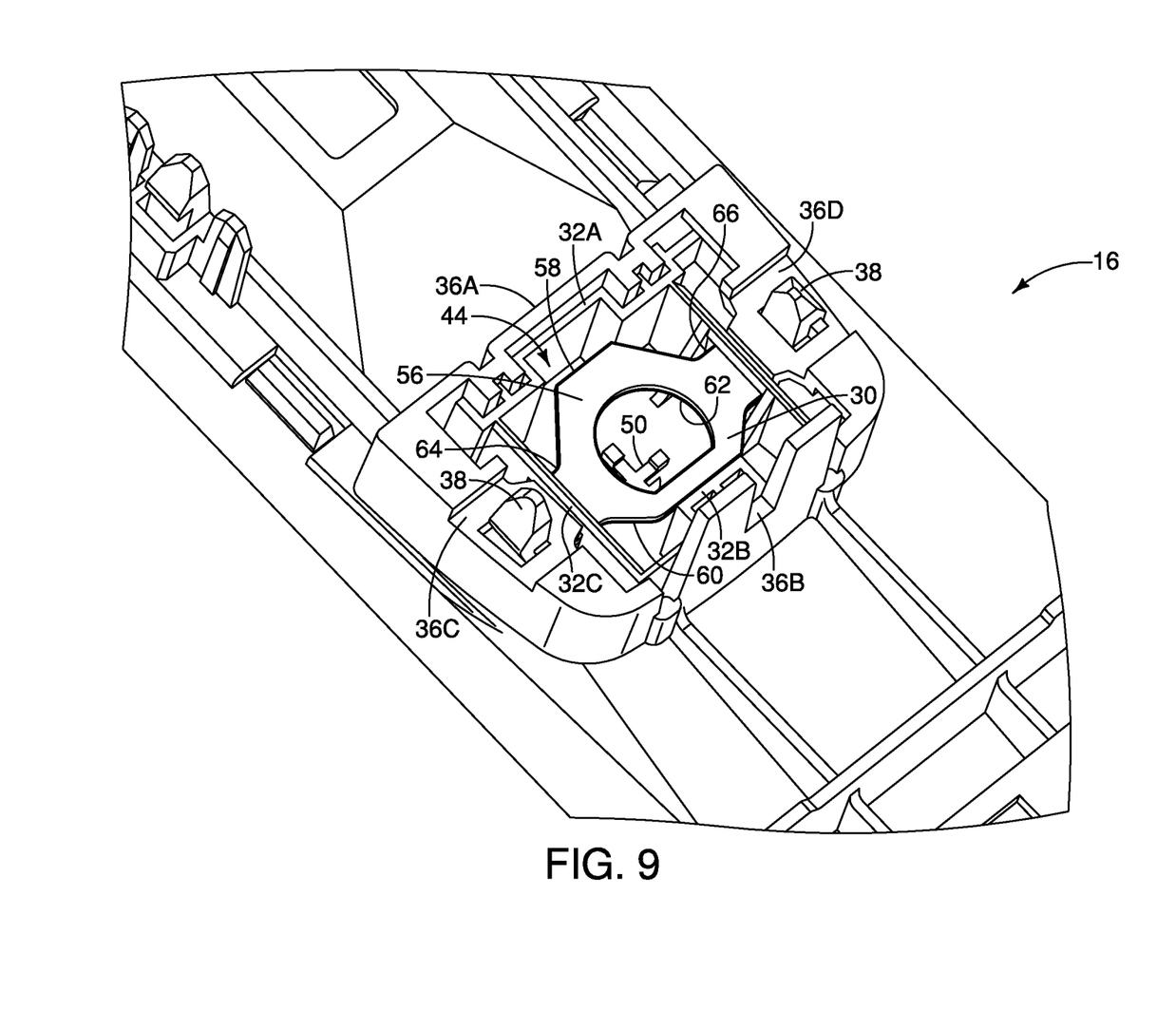
FIG. 9 is another perspective view of the lamp finisher having the retainer disposed therein.
Figure 10:
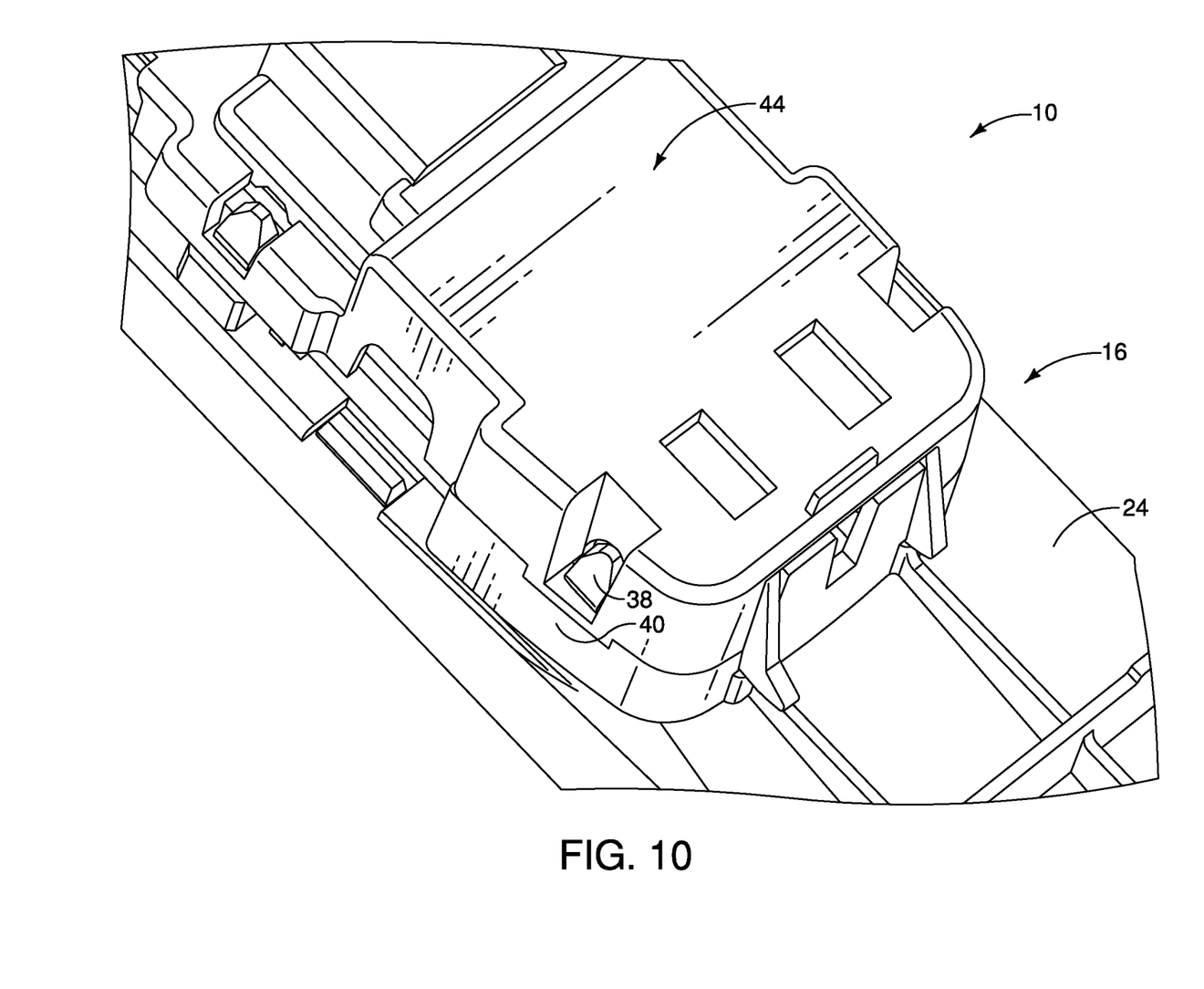
FIG. 10 is a perspective view of the lamp finisher having an interior housing installed thereon.

During assembly, the knob 28 is fitted to the first receptacle 36 such that the first and second side extensions 36E and 36F of the first receptacle 36 extend into the side openings 32E and 32F of the knob 28, as seen in FIGS. 4 and 7. The retainer 30 is also fitted through the side openings 32E and 32F of the knob 28 to sit on the first and second side extensions 36E and 36F, as seen in FIG. 8. The interior housing 22 is then snapped over the lamp finisher 16 to engage with the fasteners 38 of the first receptacle 36, as seen in FIGS. 4 and 9.

When the interior housing 22 engages with the lamp finisher 16, the interior housing 22 pushes the knob 28 in the exterior direction so that the retainer 30 comes to abut the upper bridges 52 of the side openings 32E and 32F. As shown in FIG. 4, the retainer 30 is sandwiched between the upper bridges 52 of the knob 28 and the side extensions 36E and 36F of the lamp finisher 16. Thus, the retainer 30 is sandwiched between a portion of the lamp finisher 16 and a portion of the knob 28. The retainer 30 is spaced from the base 46 of the knob 28 when the interior housing 22 is assembled to the lamp finisher 16. The knob 28 is locked in place inside the lamp finisher 16 by the engagement of the retainer 30 with the lamp finisher 16.

Figure 11:
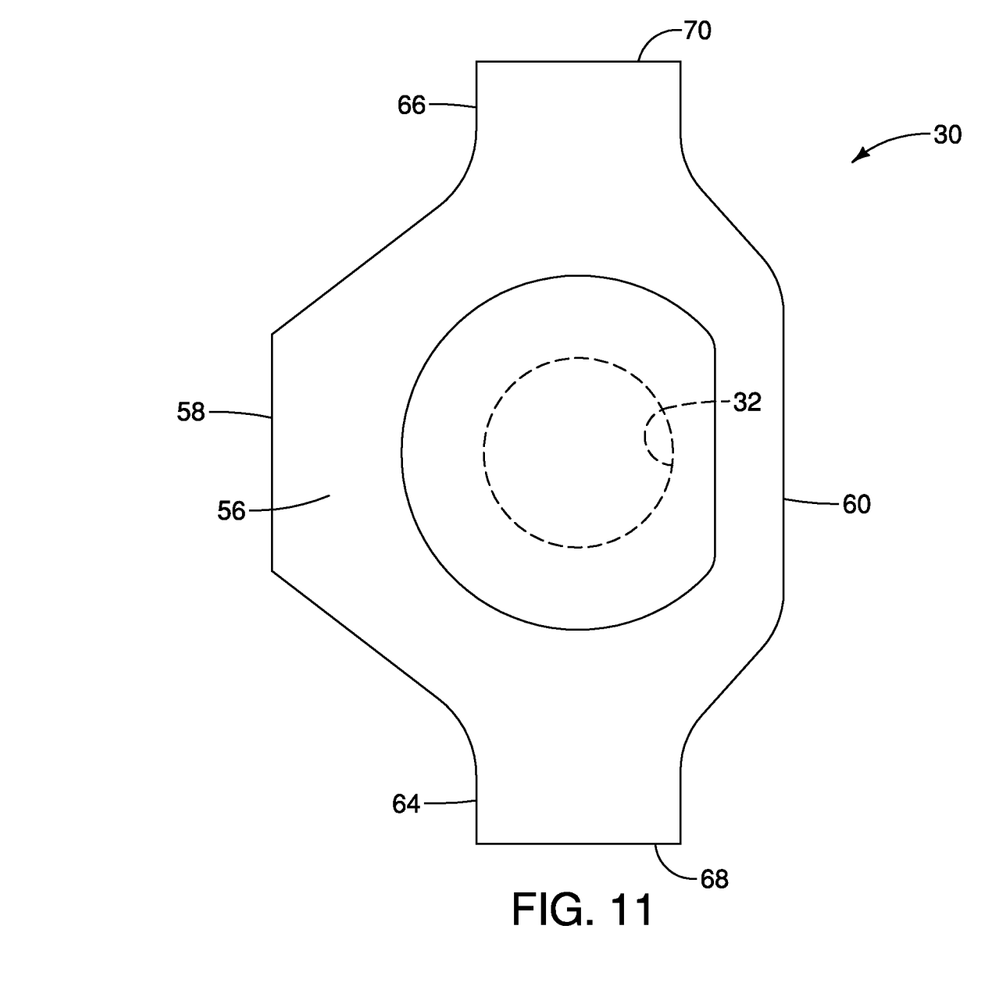
FIG. 11 is a plan view of the retainer.

Referring to FIGS. 4 and 11, the retainer 30 is made of a rigid, durable material, preferably metal such as steel or aluminum. In the illustrated embodiment, the retainer 30 is formed as a bar or a strap. In particular, the retainer 30 is a metal plate or a metal panel that is preferably a single one-piece member. It will be apparent to those skilled in the vehicle field from this disclosure that the retainer 30 can alternatively be made of plastic or other suitably rigid material to retain the knob 30 with respect to the lamp finisher 16. It will also be apparent to those skilled in the vehicle field from this disclosure that the retainer 30 can alternatively be comprised of a two or more separate components that are disposed between the knob 30 and the lamp finisher 16 to retain the knob 30 with respect to the lamp finisher 16.

As shown in FIG. 11, the retainer 30 includes a main body 56 having a forward edge 58 and a rearward edge 60 of the retainer 30. The main body 56 further includes a clearance hole 62 extending between the forward and rearward edges 58 and 60. The clearance hole 62 receives the knob plunger 33 therethrough. That is, the knob plunger 33 extends through the clearance hole 62 when the interior housing 22 is attached to the lamp finisher 16.

The main body 56 has a maximum diameter of the retainer 30. The retainer 30 further includes a pair of first and second arms 64 and 66 extending from the main body 56. The first arm 64 includes a first lateral edge 68 and the second arm 66 includes a second lateral edge 70 of the retainer 30. The first and second arms 64 and 66 have a diameter that is less than the maximum diameter. The first and second arms 64 and 66 are sandwiched by the portion of the lamp finisher 16 and the portion of the knob 28.

In the illustrated embodiment, the clearance hole 62 has a maximum diameter that is greater than a size and diameter of the knob plunger 33 so that the knob plunger 33 can extend at least partially through the clearance hole 62, as seen in FIGS. 4 and 11. In the illustrated embodiment, the main body 56 has an asymmetric shape so that the main body 56 defines a poka-yoke for the retainer 30.

As best seen in FIGS. 2 and 3, the retainer 30 is dimensioned with respect to the second receptacle 44 so that the forward edge 58 is positioned to face the front sidewalls 36A and 32A of the first and second receptacles 36 and 44 after installation. The retainer 30 is dimensioned with respect to the second receptacle 44 so that the rearward edge 60 is positioned to face the rear sidewalls 36B and 32B of the first and second receptacles 36 and 44 after installation. In the illustrated embodiment, the clearance hole 62 is dimensioned with respect to the knob plunger 33 so that the knob plunger 33 has a one to two millimeter clearance from the perimeter of the clearance hole 62.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle lamp assembly. Accordingly, these terms, as utilized to describe the present invention should be interpreted relative to a vehicle equipped with the vehicle lamp assembly.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle lamp assembly, comprising:
    a lamp finisher that defines an exterior housing for the vehicle lamp assembly;
    a knob that is movable with respect to the lamp finisher between an ON position and an OFF position; and
    a retainer that is a metallic plate sandwiched between a portion of the lamp finisher and a portion of the knob such that the retainer is entirely enclosed within the exterior housing, the retainer having a clearance hole that receives the portion of the knob, the clearance hole being asymmetric and having a straight edge and an arcuate edge, the knob being retained to the lamp finisher by the retainer.

2. The vehicle lamp assembly in accordance to claim 1, wherein
    the lamp finisher includes a first receptacle that receives the knob, the knob being movable within the first receptacle.

3. The vehicle lamp assembly in accordance to claim 2, wherein
    the knob includes a pair of front and rear sidewalls and a pair of lateral sidewalls that together define a second receptacle, the second receptacle receiving the knob plunger therethrough.

4. The vehicle lamp assembly in accordance to claim 3, wherein
    the retainer extends across the second receptacle to contact each of the lateral sidewalls of the knob.

5. The vehicle lamp assembly in accordance to claim 4, wherein
    the first and second lateral sidewalls includes a pair of first and second side openings, respectively.

6. The vehicle lamp assembly in accordance to claim 5, wherein
the lamp finisher includes a pair of first and second side extensions, the first and second side extensions extending into the first and second side openings of the knob.

7. The vehicle lamp assembly in accordance to claim 6, wherein
the retainer is sandwiched between the first and second side extensions of the lamp finisher and the first and second lateral sidewalls of the knob.

8. The vehicle lamp assembly in accordance to claim 1, further comprising a knob plunger operatively connected to the knob to move between the ON position and the OFF position, the knob plunger extending through the clearance hole of the retainer.

9. The vehicle lamp assembly in accordance to claim 8, wherein
the knob includes a receptacle, the retainer extends laterally across the receptacle.

10. The vehicle lamp assembly in accordance to claim 9, further comprising a knob plunger operatively connected to the knob to move between the ON position and the OFF position, the knob plunger extending through a portion of the retainer.

11. The vehicle lamp assembly in accordance to claim 10, wherein
the retainer includes a clearance hole for receiving the knob plunger therethrough.

12. The vehicle lamp assembly in accordance to claim 11, further comprising
an interior housing that houses the knob plunger, the interior housing being fitted to and received by the lamp finisher to secure the knob within the first receptacle of the lamp finisher.

13. The vehicle lamp assembly in accordance to claim 12, wherein
the retainer includes a main body having the clearance hole, the main body having a maximum dimension of the retainer.

14. The vehicle lamp assembly in accordance to claim 13, wherein
the retainer further includes a pair of first and second arms extending from the main body, the first and second arms having a dimension that is less than the maximum dimension.

15. The vehicle lamp assembly in accordance to claim 14, wherein
the first and second arms are sandwiched by the portion of the lamp finisher and the portion of the knob.

* * * * *